US012265163B2

(12) United States Patent
Fortney

(10) Patent No.: US 12,265,163 B2
(45) Date of Patent: Apr. 1, 2025

(54) NAVIGATION SYSTEM

(71) Applicant: Science Applications International Corporation, Reston, VA (US)

(72) Inventor: George Fortney, Toms River, NJ (US)

(73) Assignee: Science Applications International Corporation, Reston, VA (US)

( * ) Notice: Subject to any disclaimer, the term of this patent is extended or adjusted under 35 U.S.C. 154(b) by 140 days.

(21) Appl. No.: 17/357,160

(22) Filed: Jun. 24, 2021

(65) Prior Publication Data

US 2022/0413160 A1 Dec. 29, 2022

(51) Int. Cl.
*G01S 19/48* (2010.01)
*G01S 19/47* (2010.01)
G01C 21/02 (2006.01)
G01C 21/16 (2006.01)
G01S 19/21 (2010.01)

(52) U.S. Cl.
CPC ............ *G01S 19/485* (2020.05); *G01S 19/47* (2013.01); *G01C 21/025* (2013.01); *G01C 21/1656* (2020.08); *G01S 19/21* (2013.01)

(58) Field of Classification Search
CPC ........ G01S 19/485; G01S 19/47; G01S 19/21; G01C 21/025; G01C 21/1656
USPC ......................................... 342/357.31, 357.3
See application file for complete search history.

(56) References Cited

U.S. PATENT DOCUMENTS

| | | | | |
|---|---|---|---|---|
| 4,621,329 A * | 11/1986 | Jacob | ................... | G01C 21/025 701/513 |
| 6,463,366 B2 * | 10/2002 | Kinashi | ................... | G01S 19/14 701/4 |
| 8,041,118 B2 * | 10/2011 | Fowell | ............... | G06V 40/1365 382/294 |
| 8,355,868 B2 * | 1/2013 | Brace | ................... | G01C 21/025 382/218 |
| 8,767,072 B1 * | 7/2014 | Rosenwinkel | ............ | G06T 7/74 348/148 |
| 9,341,517 B1 * | 5/2016 | Stone | .................... | G01J 1/4228 |
| 9,702,702 B1 * | 7/2017 | Lane et al. | ........... | G01C 21/025 |
| 9,726,765 B2 * | 8/2017 | Arthur | .................... | G01S 19/45 |

(Continued)

FOREIGN PATENT DOCUMENTS

WO WO-2019238950 A1 * 12/2019

OTHER PUBLICATIONS

H. Xiong et al., "Fault-Tolerant GNSS/SINS/DVL/CNS Integrated Navigation and Positioning Mechanism Based on Adaptive Information Sharing Factors," in IEEE Systems Journal, vol. 14, No. 3, pp. 3744-3754, Sep. 2020 (Year: 2020).*

(Continued)

*Primary Examiner* — Chuong P Nguyen
(74) *Attorney, Agent, or Firm* — Banner & Witcoff, Ltd.

(57) ABSTRACT

Location may be determined in a way that does not primarily rely on jam-able or spoof-able techniques. For example, an apparatus may have multiple location-determining units, each unit having a different level of trust. One unit may have a first (e.g., highest) level of trust, a second such unit may have a second (e.g., medium) level of trust lower than the first level of trust, and a third such unit may have a third (e.g., lowest) level of trust lower than the first and second levels of trust. The apparatus may generally prefer to determine its location using the highest level of trust unit that is available at any given time.

23 Claims, 5 Drawing Sheets

(56) References Cited

U.S. PATENT DOCUMENTS

| | | | | |
|---|---|---|---|---|
| 9,791,278 | B2* | 10/2017 | McCroskey | G01C 21/1656 |
| 10,048,686 | B2* | 8/2018 | Brekke | G01C 21/20 |
| 10,761,182 | B2* | 9/2020 | Tchilian | G01C 21/025 |
| 10,838,076 | B2* | 11/2020 | Onomura | G08G 5/0047 |
| 10,901,190 | B2* | 1/2021 | Waldron | G02B 13/06 |
| 11,079,234 | B2* | 8/2021 | Belenkii | G01S 19/393 |
| 11,168,984 | B2* | 11/2021 | Li | G01C 21/025 |
| 11,169,534 | B2* | 11/2021 | Micks | G01C 21/30 |
| 11,393,216 | B2* | 7/2022 | Maloney | G06N 3/084 |
| 11,543,485 | B2* | 1/2023 | Suzuki | G01C 21/005 |
| 2011/0077863 | A1* | 3/2011 | Brace | G01C 21/025 |
| | | | | 382/218 |
| 2016/0282123 | A1* | 9/2016 | McCroskey | G01C 21/005 |
| 2016/0381267 | A1* | 12/2016 | Waldron | H04N 23/55 |
| | | | | 348/169 |
| 2017/0023659 | A1* | 1/2017 | Bruemmer | G01S 5/0278 |
| 2017/0075355 | A1* | 3/2017 | Micks | G05D 1/0274 |
| 2017/0131716 | A1* | 5/2017 | Brekke | G01C 21/20 |
| 2017/0328716 | A1* | 11/2017 | Ma | G06F 18/241 |
| 2019/0056512 | A1* | 2/2019 | Onomura | G01S 19/47 |
| 2021/0033400 | A1* | 2/2021 | Belenkii | G02B 23/04 |

OTHER PUBLICATIONS

Gao et al. "Multi-sensor Optimal Data Fusion for INS/GNSS/CNS Integration Based on Unscented Kalman Filter." Int. J. Control Autom. Syst. 16, 129-140 (2018). (Year: 2018).*

Wang et al. "Performance enhancement of INS/CNS integration navigation system based on particle swarm optimization back propagation neural network, Ocean Engineering," vol. 108, 2015, pp. 33-45 (Year: 2015).*

Diphda. (Apr. 2020). Retrieved from Start-Facts: <<https://www.star-facts.com/diphda/>>, 16 pages.

Celestial Navigation Information Network. (2020). The Navigational Stars. Retrieved from Celestial Navigation Information Network: <<https://celestialnavigation.info/the-navigational-stars/>>, 29 pages.

Powell, M.J. (2020). Visibility of the Planets, 2008 to 2025. When are the Planets on view? Retrieved from Naked eye Planets: <<https://nakedeyeplanets.com/visibility.htm#/explanation>>, 6 pages.

Gooley, T. (Dec. 2018). Moon Phase Navigation. Retrieved from Natural Navigator: <<https://www.naturalnavigator.com/news/2018/12/moon-phase-navigation/>>, 10 pages.

* cited by examiner

NAVIGATION SYSTEM

BACKGROUND

Current Global Navigation Satellite Systems (GNSS) location services, such as the Global Positioning System (GPS), may be targeted by adversarial efforts to damage satellites or to jam or spoof signals. Efforts to interfere with GNSS signals or satellites may jeopardize the reliability of existing location services.

SUMMARY

Accordingly, it would be desirable to provide systems and methods for determining location that may be jam-proof, spoof proof, and do not rely on satellites. Such systems may include one or more location-determining sub systems, such as geo-celestial navigation; other assured position, navigation, and timing (APNT) capabilities; and GPS. The following presents a simplified summary in order to establish a baseline understanding of some aspects of the disclosure. It is intended neither to identify key or critical elements of the disclosure nor to delineate the scope of the disclosure. The following summary merely presents some concepts of the disclosure in a simplified form as a prelude to the detailed description below.

According to some aspects as described herein, methods, apparatuses, systems, and software are described for determining a location in a way that does not necessarily rely on easily jam-able or spoof-able techniques. For example, an apparatus is described having multiple location-determining units, each unit having a different level of trust. One unit may have a first (e.g., highest) level of trust, a second such unit may have a second (e.g., medium) level of trust lower than the first level of trust, and a third such unit may have a third (e.g., lowest) level of trust lower than the first and second levels of trust. The apparatus may generally prefer to determine its location using the highest level of trust unit that is available at any given time. For example, if the unit having the first level of trust is available, the apparatus may use that unit to determine the location. However, if that unit having the first level of trust is not available, then the apparatus may fall back to the unit having the next-highest level of trust to determine the location. The apparatus may continue to monitor the availability of one or more of the units and, for each of a plurality of locations determined over time, use the highest level-of-trust unit available at any given time to determine the respective location. In certain embodiments, the highest level-of-trust unit does not rely on satellites and/or does not use techniques that accumulate errors over time such as dead reckoning, allowing the apparatus to provide accurate positioning while reducing or even eliminating the problems of jamming and spoofing.

For example, such an apparatus may comprise an optical unit configured to receive at least one image of a plurality of celestial objects; an inertial navigation unit (INU); a global positioning system (GPS) receiver; and a controller (which may include one or more processors). The optical unit may comprise a hemispherical camera that is able to take images of celestial bodies in the sky (or in space, where the apparatus is mounted to a space vehicle). The controller may be configured to cause the apparatus to determine a location of the apparatus using the optical unit if the optical unit is available to determine the location, and to determine the location of the system based on one or both of the INU or the GPS receiver if the optical unit is unavailable to determine the location.

As another example, the apparatus may monitor whether the optical unit is available. Based on a determination that the optical unit is available, the apparatus may use the optical unit to generate a plurality of images of a plurality of celestial objects, may determine a first location based on the plurality of images, and may output first data indicating the first location. Based on a determination that the optical unit is unavailable (perhaps at another time to determine a second location), the apparatus may use the INU to determine the second location, without using the optical unit, and may output second data indicating the second location.

These and other aspects will be described in Detailed Description below with reference to the various drawings.

BRIEF DESCRIPTION OF THE DRAWINGS

Some features herein are illustrated by way of example, and not by way of limitation, in the figures of the accompanying drawings, in which like reference numerals refer to similar elements, and wherein.

DETAILED DESCRIPTION

Figure 1:
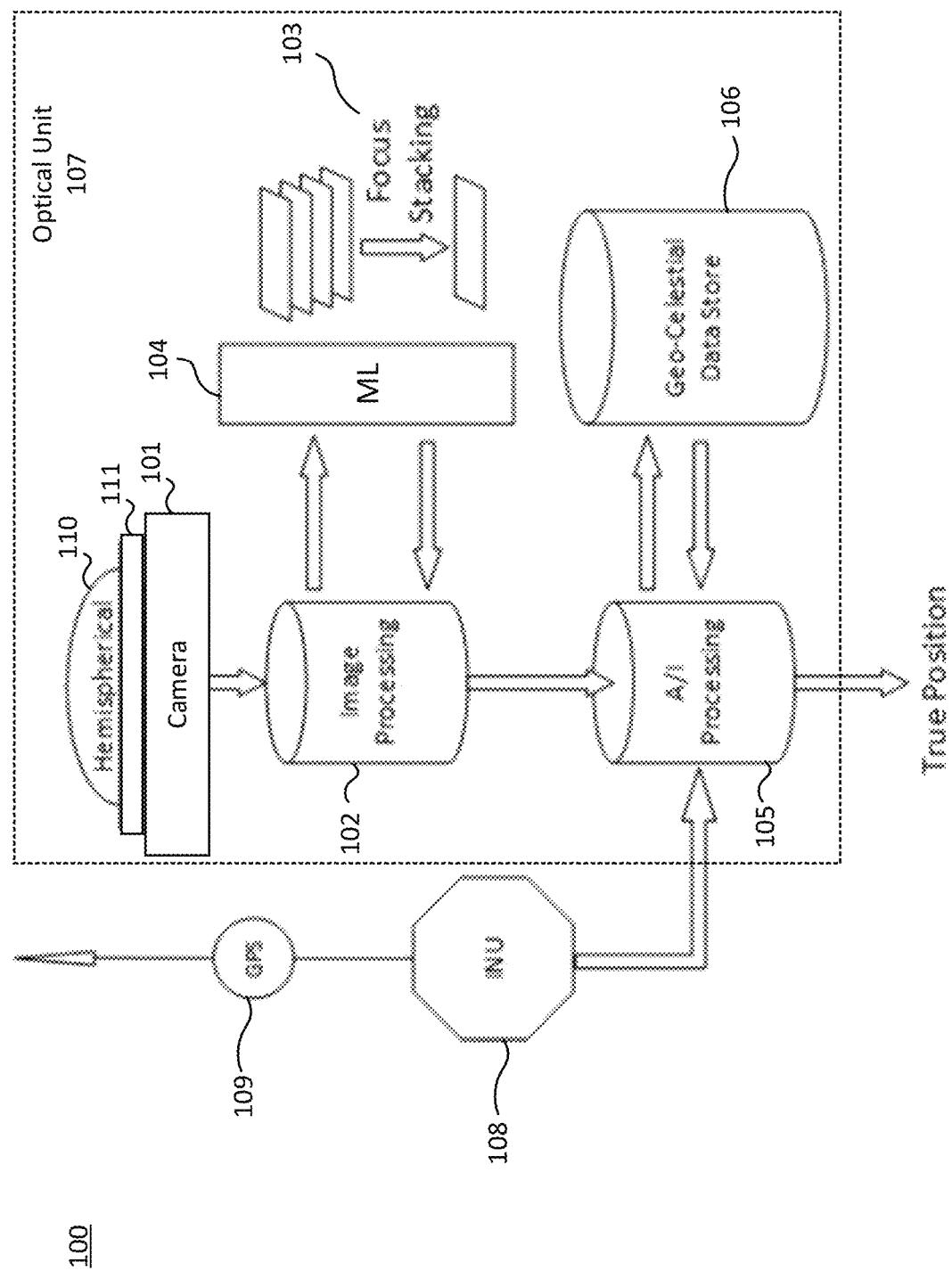
FIG. 1 is an example block diagram of a system that may be used to implement one or more functions and processes described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure.

Various connections between elements are discussed in the following description. Unless specified otherwise, these connections are general and may, for example, may be direct or indirect, wired or wireless, physical or logical (e.g., virtual or software-defined), in any combination.

Using celestial objects as input data may enable a navigation system that cannot be jammed or spoofed. Of the approximately 6,000 stars visible to the naked eye under optimal conditions, 58 stars are currently considered to be among the brightest and span 38 constellations of the celestial sphere from the declination of −70° to +89°. The star Polaris, often called the "North Star", is treated specially due to its proximity to the north celestial pole. When navigating in the Northern Hemisphere, special techniques can be used with Polaris to determine latitude or gyrocompass error. The other selected stars (currently, 57) have daily positions given in nautical almanacs (such as those published by the U.S. Naval Observatory), aiding the navigator in efficiently performing observations on them. A second group of "tabulated stars" (currently, 115 tabulated stars) can also be used for celestial navigation, but are often less familiar to the navigator and require extra calculations.

Of course, the stars are not always visible in daylight, but other types of celestial objects—such as the planets—can be used to determine position. Many planets are viewable during daylight. This does pose a challenge, as the planets travel in an orbit and are not static like the stars. In order to use the planets to navigate, it is useful to know when to expect them in the sky. Fortunately, the planetary orbits are very predictable. For example, a table of when the planets are visible month to month and year by year can be found in Powell, M. J., "Visibility of the Planets, 2008 to 2025—When are the Planets on view?" www.nakedeyeplanets.com/visibility.htm. This can be extrapolated out to decades into the future.

The position of the Moon (another example of a celestial object) can be used to navigate. The Moon follows a known orbit following waxing crescent to full and then to waning gibbous over a 28 day period. The Moon moves approximately 12 degrees east of the sun every 24 hours. The phase of the Moon tells how old it is in its cycle and therefore where it will be in the sky relative to the Sun—i.e., how many degrees east of the sun it has moved. For example, a full moon is 15 days old and is 180 degrees away from the Sun, in other words, opposite the Sun. When the Sun is east, the moon will appear opposite it in the west, and vice versa. For example, the relationship of the phases of the Moon and the bearing based on time of day may be found at Gooley, T., "Moon Phase Navigation," www.naturalnavigator.com/news/2018/12/moon-phase-navigation/.

By knowing the year, the month, the day, and the time, it is possible determine position using the planets, the Moon, and/or stars (including the Sun). These celestial objects cannot be jammed, spoofed, or destroyed by a kinetic or non-kinetic means. This is especially true if these celestial objects are able to be located in many conditions such as in daylight and during adverse weather events.

Devices described herein may utilize the location of celestial objects in the sky (e.g., the planets, stars, and/or the Moon) to determine a precise location anywhere on Earth. An example block diagram of such a device is shown in FIG. 1 as apparatus 100. Apparatus 100 may provide functionality referred to herein as Geo-Celestial M/L A/I Navigation (GMAN). As will be explained further below, the apparatus 100 may comprise an optical unit 107 that may provide the GMAN functionality, as well as other position-determining functionality such as a GPS receiver 109 and/or an INU 108 (or other APNT technology), which may be used in parallel with and/or as temporary alternatives to the optical unit 107 such as when the optical unit 107 is not available. As will be explained further herein, the various position-determining units 107-109 may be organized as a hierarchy of levels of trust. For example, the optical unit 107 may be considered by the apparatus 100 to have the highest level of trust, and the GPS receiver 109 and/or INU (or other APNT technology) 108 may be considered to have lower levels of trust. Moreover, as will be explained further herein, the apparatus 100 may prioritize, based on the relative levels of trust, which one or more of the position-determining units 107-109 to use at any given time as a basis for determining and reporting the apparatus's 100 location (referred to herein as its "true position").

A main data intake of the optical unit 107 may be a camera 101 such as a hemispherical camera (e.g., a camera having a hemispherical lens 110). Some known cameras, such as the ALLSKY by SBIG with a fisheye lens and Kodak KAI-340 CCD Sensor, provide a view of the sky. Hemispherical photography, also known as canopy photography, uses photographs taken looking upward through an extreme wide-angle lens or a fisheye lens. Most of the existing panoramic cameras have a cylindrical field of view (FOV) which has a 360° width in azimuth, but a limited height in elevation. However, a hemispherical (or near spherical) FOV is useful in many applications such as robot navigation and surveillance. While one camera 101 is shown in FIG. 1, apparatus 100 may comprise a plurality of cameras pointing in different directions. For example, where apparatus 100 is intended to be used for a sky or space-based platform (e.g., a satellite or other space ship, or an airplane or helicopter), apparatus 100 may comprise multiple cameras 101 arranged to provide, together, up to a full spherical 360 degrees of visual coverage.

Many celestial objects may be viewed in the daytime using a set of different filters 111 to filter the images received by the camera 101. There are known filters that work well with the planets, stars, and the moon. Using some filters, celestial objects that appear close to the Sun may be made more visible and therefore more recognizable. For example, viewing Jupiter through a red filter may enhance the planet so that it is more easily viewable, even when located so as to be observable near the Sun.

The filter set 111 may comprise a plurality of different filters that may be user-selectable or automatically selectable, through which the camera 101 may view celestial objects. An example filter set 111 that may be used for celestial viewing may include the filters #8 light yellow, #21 orange, #80A blue, and/or Baader Neodymium. A filter wheel (such as a FW5-STX filter wheel) may hold the filter set 111 and may be attached to the camera (such as an STX camera). The filter wheel may hold a plurality of filters, which may each be of any shape and size as desired appropriate to the camera 101 being used, and may provide the camera 101 with selectable access to each of the filters in the filter set 111 for the same field of view (FOV). For example, the FW5-STX holds five 65 mm square filters, or five 50 mm square filters. The filter wheel of the filter set 111 may also be automated such that the apparatus 100 may automatically select any of the filters of the filter wheel (or other implementation of the filter set 111) without human physical intervention, such as via a motor that turns or otherwise moves the filter wheel. The motor and/or the camera 101 may be operated and coordinated by a controller of the apparatus 100 (such as a controller 301 that is discussed below with reference to FIG. 3).

The camera 101, equipped with such an automatic filter wheel or other implementation of the filter set 111, may take a plurality of filtered images of the sky, and those plurality of filtered images may be part of the data ingest of the apparatus 100. This ingest may be enabled by software such as, for example, Apache NiFi, Kafka, and/or Zookeeper. This streaming ingest may be processed by an image processing unit 102, and the processed images may be stored into a data lake for a Machine Learning (ML) unit 104 of the optical unit 107. The ML unit 104 may perform pattern matching and recognition of the plurality of filtered images to produce a single image. The single image may be produced so as to have, for example, a highest number of celestial objects and/or to satisfy one or more predetermined image characteristics. This process is called focus stacking. Focus stacking may help a camera device get a deeper depth of field without resorting to microscopic aperture sizes that can actually soften an image due to diffraction. Focus stacking may also allow a camera device to maintain the blurred background of a large aperture, while keeping the subject completely in focus. In the optical unit 107, focus stacking may produce a single image based on a plurality of images (each taken with a different one of the filters), and may allow all the celestial objects visible with one of the filters of the filter set 111 to be stacked with the different objects visible with a different other one or more of the filters. The result of focus stacking may be the above-mentioned single image, which may be produced to have all of the celestial objects that are visible with all the filters, and may also benefit from adding in any additional clarity the combined images may bring. The produced single image may include a set of celestial objects that is the union of the sets of celestial objects in each of the plurality of images (that each uses a different filter of the filter set 111). For example, if a first image using a first filter of the filter set 111 includes the set of celestial objects [A, B, C], and a second image using a second filter of the filter set 111 includes the set of celestial objects [B, C, D], then the produced single focus-stacked final image may include the union of those two sets, i.e., the set of celestial objects [A, B, C, D], which may be aligned so that one or more of the celestial objects [A, B, C, and/or D] are presented only once in the final image.

The single final image resulting from focus stacking may be stored (e.g., passed to an enterprise warehouse of images) and tagged with meta-data of date and time and current known position (this known position may be determined, for example, via dead reckoning using the INU 108 or other APNT methodologies). An artificial intelligence (A/I) processing unit 105 may analyze the image by, for example, comparing the image to a predetermined map of the entire earth's sky (stored in geo-celestial data store 106) to determine where the GMAN system 100 is in the world. Even if some of the 6000 visible stars, or planets or the moon were not available (e.g., during an adverse weather event), there would be enough objects for the A/I module to determine the current location based on the image.

The apparatus 100 may know the current year, month, day, and time. The earth's rotation and the varying orbits of the planets are of a known cycle (which may be stored in memory or other storage of the apparatus 100). The apparatus 100 may comprise the inertial navigation unit (INU) 108, sometimes also referred to as an inertial measurement unit. The INU 108 may provide APNT functionality for the apparatus 100 and may be based on the classical mechanics of Newton. Assuming that acceleration of an object is measured, the speed and azimuth changes of the object can be calculated by the continuous mathematical integration of the acceleration to the time. The INU 108 may use one or more motion sensors (e.g., gyroscopes and/or accelerometers) to measure, e.g., the apparatus's 100 azimuth. The apparatus 100 may determine, based on measurement data of the motion sensors (which may indicate angular velocity and/or acceleration), motion of the apparatus 100 in the inertial reference frame at any given time. The INU 108 may comprise a grand master clock (not explicitly shown), which may be, for example, a chip scale atomic clock (CSAC). The grand master clock may provide highly accurate time to an internal clock of the apparatus 100. For example, the apparatus 100 may determine the current year, month, day, and time using the grand master clock. The INU 108 may provide all of the time synchronization as well as APNT capabilities for dead reckoning navigation by the GMAN 100 system.

The apparatus 100 may also comprise the GPS unit 109. The GPS unit 109 may serve a twofold purpose. First, it may provide a starting point for the APNT and camera-based navigation. Second, if the camera-based navigation and APNT disagree with the GPS then this may be an indication that the GPS signal is compromised (spoofed), or if there is no GPS signal, possibly jammed. From a tactical perspective, it is useful to know when jamming or spoofing occurs.

The apparatus 100 may provide day and/or night celestial navigation, dead reckoning via APNT, and/or regular GPS. The combination of machine learning (M/L) and artificial intelligence (A/I) may provide assurance to the user that the system has not been compromised, and a true position of the apparatus 100 may be validated, verifiable, and have redundancies built in so that the true position is always available. A minimum number of celestial objects (for example, at least three celestial objects) may be required to be observed for the apparatus 100 to find the true position using celestial navigation. If there are not at least the minimum number (e.g., three) celestial objects observed by the apparatus 100, then the INU 108 may calculate the new true position. The GPS unit 109 may verify the INU's 108 calculation, in that the apparatus 100 (such as by AI processing unit 105 and/or by the INU 108) may compare the position determined using the GPS unit 109 with the position determined using the INU 108. If any difference in these two positions (differential drift) occurs, then the difference may be used to course correct the true position. In the case of jamming or spoofing, the INU 108 may be used for determining the true position without GPS unit 109 input. In the hierarchy of trust, the GMAN true position may be highest, followed by the INU 108 for APNT, and then below those may be the position determined by the GPS unit 109. The determined true position, when available, may be used to course correct for any differential drift the INU 108 experiences. GMAN may always be available unless there is severe obfuscation of the sky that cannot be corrected using the filters of the camera 101. In such a situation of severe obfuscation, the INU 108 may take ownership of the true position until the camera 101 is able to sufficiently view the minimum number of celestial objects. This may be transparent to the end user of the apparatus 100.

Artificial intelligence (AI) is a technology that enables a machine to simulate certain aspects of human behavior. Using AI, intelligent systems may be configured to perform certain tasks in a human-like manner. Machine learning (ML) is a subset of AI, and allows a machine to learn automatically from past data without explicit programming. ML works by exploring data and identifying patterns, and may involve minimal human intervention. ML is used in internet search engines, email filters to sort out spam, websites to make personalized recommendations, banking software to detect unusual transactions, and many apps on phones such as voice recognition.

Figure 2A:
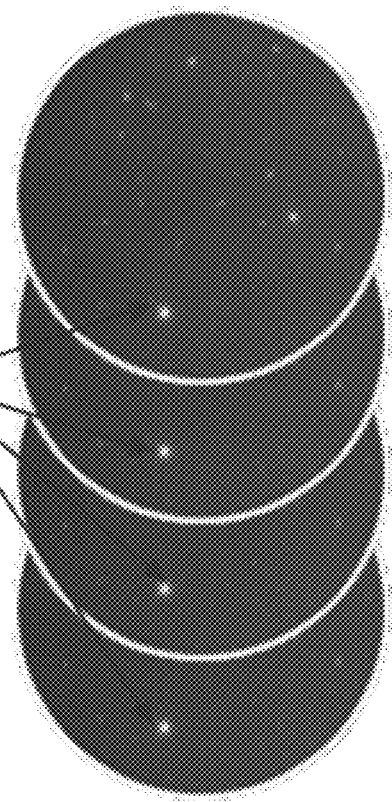
FIG. 2A shows an example set of images prior to focus stacking.
Figure 2B:
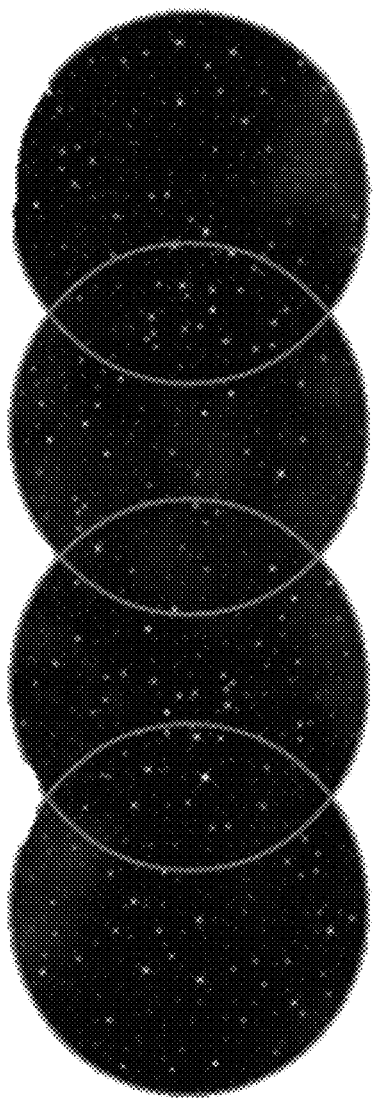
FIG. 2B shows an example focus-stacked image.

Due to the vast number of continual filtered images, it may be desirable to employ ML, such as via the ML unit 104, for quickly and accurately performing focus stacking 103 of multiple images collected via the camera 101 using different filters. One challenge is how to implement focus stacking quickly and accurately while the apparatus 100 is on the move (e.g., quickly traveling over land, through the air, or through space such as in orbit). Celestial objects that are discovered with one filter may have moved within the optical view of the camera 101 while the apparatus 100 is moving between using different filters. This could result in one or more celestial objects each being counted twice (or even more than twice), and thus a false determined true position may result. For example, FIG. 2A shows how the same star or other celestial object may be counted four times (across four different images each using a different one of the filters) if focus stacking were performed without taking into account the movement of the camera 101 (no motion correction). In contrast, FIG. 2B shows a result of focus correction, in which the produced focus-stacked final image includes any given celestial object of interest only once.

The apparatus 100 may be associated with, and travel with, a vehicle (e.g., be connected to, or reside in or on the vehicle) such as a car, truck, jeep, bus, van, airplane, helicopter, satellite, space ship, etc. In the apparatus 100, the ML unit 104 may receive input from the vehicle and from the INU 108 to determine speed and bearing of the vehicle, and thus also of the apparatus 100. From these data points, the ML unit 104 may determine how much and where to shift the images received from the camera 101 (and optionally processed by the image processing unit 102) to generate a final image in which the celestial objects found with the many filters are correctly focus-stacked. This final image may then be sent to the AI processing unit 105 for location services (e.g., for determining the location, or "true position," of the apparatus 100). Such on-the-move (OTM) focus stacking may generate many images with different positions of celestial body positions that depend on how fast the vehicle (and thus the apparatus 100) is moving. The ML unit 104 may have the ability to layer many focus-stacked images into a panorama for better accuracy by the AI, such as shown in FIG. 2A. Of course, decreased speed will layer the images closer to one another than shown in FIG. 2A, and faster speed will layer the images farther from one another. The apparatus 100 may determine the speed of movement (based on information from the INU 108) and dynamically compensate for any changes in speed on the fly that may occur between the multiple images being focus-stacked together.

The AI processing unit 105 may use a skymap of known images in a database (the geo-celestial data store 106) that it uses to search first based on assumed location, and then for exact pattern matching of the focus-stacked image as compared to the sky map stored in the geo-celestial data store 106. The geo-celestial data store 106 may contain large maps of the sky view with a plurality of associated known celestial bodies. This pattern-matching with the sky view may be used by the AI processing unit 105 to verify the assumed location and to determine and return the true position of the apparatus 100.

The concept of true position and the methods used by apparatus 100 may increase the reliability of the determined position relative to pre-existing devices and methods. The various levels of trust may provide an end user, or consumer, of true position with additional confidence. The following discussion will explain example levels of trust, how the apparatus 100 may determine which sub system to use for determining the true position, and how the apparatus 100 may monitor subsystem health. The apparatus 100 may actively move to a more trusted sub system (having a higher level of trust) as they become available. These methods may be transparent to the consumer of true position.

Consumers of true position may expect to be provided with geolocation-related information such as vehicle orientation, direction of travel, roll, pitch yaw, rate of climb, precision time, network time, or other Global Navigation Satellite System (GNSS) type messages. Apparatus 100 may provide any of this geolocation-related information in any desired message format (e.g., NMEA, orientation based on vehicle, timestamp, etc.). To be compliant to Modular Open Systems Architectures (MOSA), software adapters may be implemented in the apparatus 100 that allow standard messages architectures and formats to be used such as Variable Message Format (VMF) per MIL-STD-6017, Vehicular Integration for C4ISR/EW Interoperability (VICTORY), and Cursor on Target (CoT).

The apparatus 100 may provide a plurality of levels of trust, wherein each different level of trust is assigned to a different one of the subsystems of the apparatus 100. For example, when the apparatus 100 has three subsystems (such as GMAN, APNT, and GPS, as listed below in Table 1), there may be three levels of trust. The highest level of trust may be, for example, the GMAN sub system as its accuracy and inability to be compromised based on using celestial objects is highest. At a second, lower, level of trust may be an APNT system, which may include an INU. In some embodiments, the APNT system does not use any external inputs except for its initial position to deliver ongoing position. At a third, still lower, level of trust may be standard GPS due to risks related to jamming, spoofing and unavailability.

TABLE 1

Example Levels of Trust

| Highest Level of Trust | Medium (2nd Highest) Level of Trust | Low (3rd Highest) Level of Trust |
|---|---|---|
| GM AN sub system Celestial object based | APNT (e.g., INU) sub system Inertial navigation based | GPS sub system Satellite based |

Figure 3:
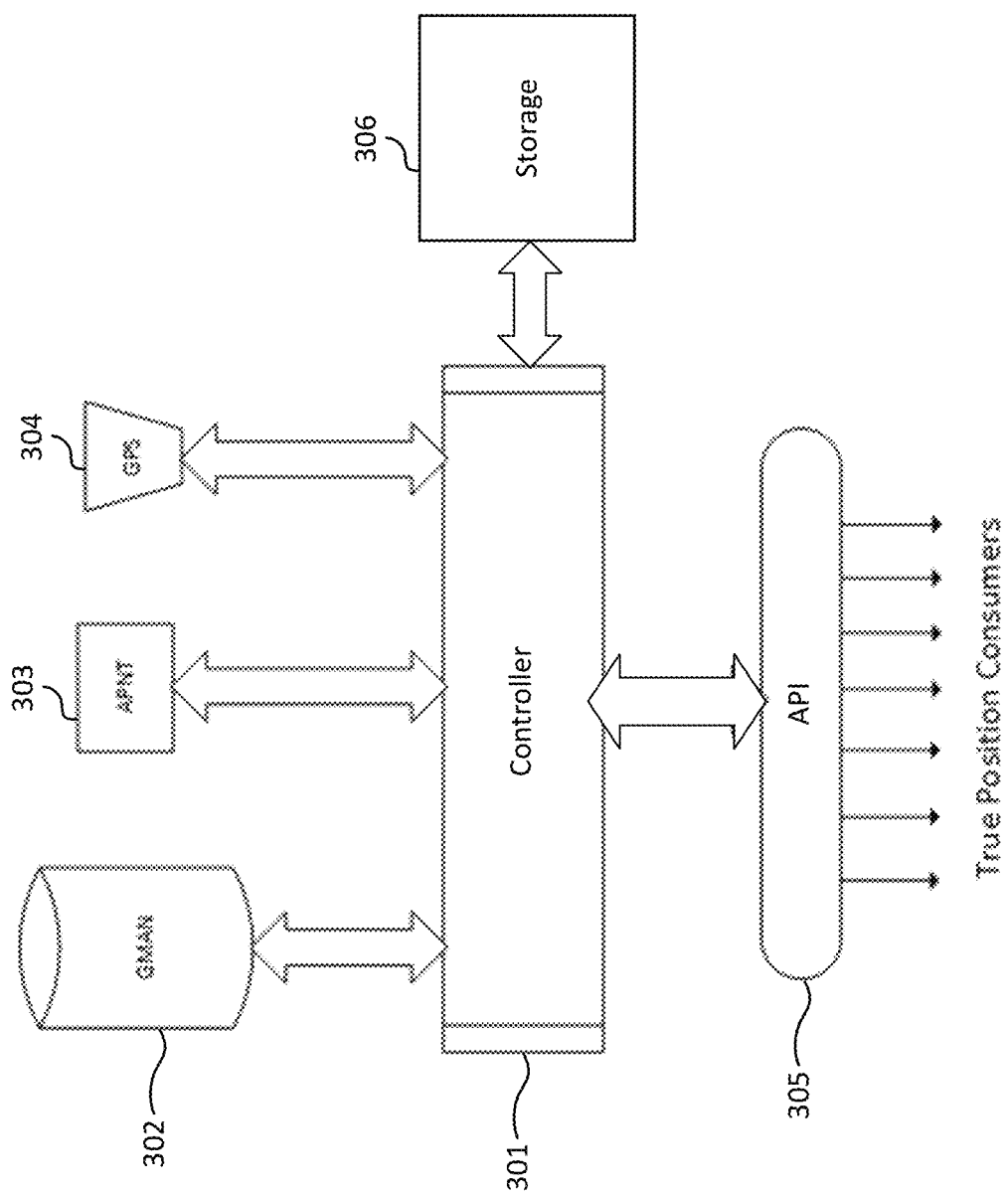
FIG. 3 is an example block diagram of a system that may be used to implement one or more functions and processes described herein.

As shown by way of example in FIG. 3, the apparatus 100 may comprise a controller 301 that may actively monitor each of the (e.g., all three) subsystems and may use, at any given time to determine true position, whichever available sub system has the highest level of trust. In the example of Table 1 and FIG. 2, the subsystems are a GMAN subsystem 302, an APNT subsystem 303, and a GPS subsystem 304. The GMAN subsystem 302 may be implemented as or otherwise comprise, for example, optical unit 107, which may comprise any of elements 101-106 and/or 110-111 in FIG. 1. The APNT subsystem 303 may be implemented as, for example, the INU 108 of FIG. 1. The INU 108 may comprise all functionality required for the APNT subsystem 303 to determine a location. The GPS subsystem 304 may be implemented as, for example, the GPS unit 109 of FIG. 1. The apparatus 100 may monitor (e.g., continuously) the availability of each of the subsystems 302-304. If the apparatus 100 lowers the level of trust due to non-availability of a higher level of trust subsystem, the apparatus's 100 continuous monitoring of sub system availability may cause the apparatus 100 to upgrade the responsibility of true position to the higher level of trust system when a higher level of trust system becomes available. Likewise, based on determining the unavailability of the highest level of trust subsystem that was previously used to determine true position, the apparatus 100 may lower the level of trust by falling back to the next highest level of trust subsystem for determining true position. Which subsystem(s) 302-304 is/are being relied upon for true position, and/or which (highest) level of trust currently applies to the true position, may be transparent to (e.g., indicated via a message such as by displaying the message on a display device) the consumer of the true position. The monitoring of subsystem availability and the changing between subsystems based on available level of trust may be automatic and may require no user intervention. One or more messages, indicating the true position and/or which sub system(s) were used to determine the true position, may be made be made available for notification systems to consume and report.

The controller 301 may be implemented as one or more processors (such as one or more CPUs) and may monitor and determine which of the subsystems 302-304 are online, and which has the highest trust level, and may maintain true position by constant monitoring of the sub systems to use the sub system with the highest trust level. The controller 301 may host an application programming interface (API) 305 so that consumers of true position will get true position regardless of which sub system(s) 302-304 is/are in use. When available, the GMAN sub system 302 may have the highest trust and may be relied upon as the primary unit for determining the true position of the apparatus 100. The controller 301 may cause the apparatus 100 to perform any operations, for example, executing computer-readable instructions stored in one or more non-transitory computer-readable media (depicted in FIG. 3 as storage 306), such as one or more memories, hard drives, FLASH drives, and/or the like. Additionally or alternatively, the controller 301 may comprise circuitry configured to perform any of the operations described herein and attributed to the controller 301, with or without executing stored instructions. While particular example operations as described herein may be attributed to the controller 301, the controller 301 may also be responsible for performing, coordinating, triggering, or otherwise causing any other operations to be performed by the apparatus 100.

Any of the elements of FIG. 2 or of FIG. 3 may be packaged together in such a way that they move together as a single device. For example, any of the elements of FIG. 2 or FIG. 3 may be at least partially located within the same housing. The housing may have one or more elements (e.g., clamps, mounts, etc.) that may allow the apparatus 100 to be mounted to another object, such as to a vehicle.

Figure 4:
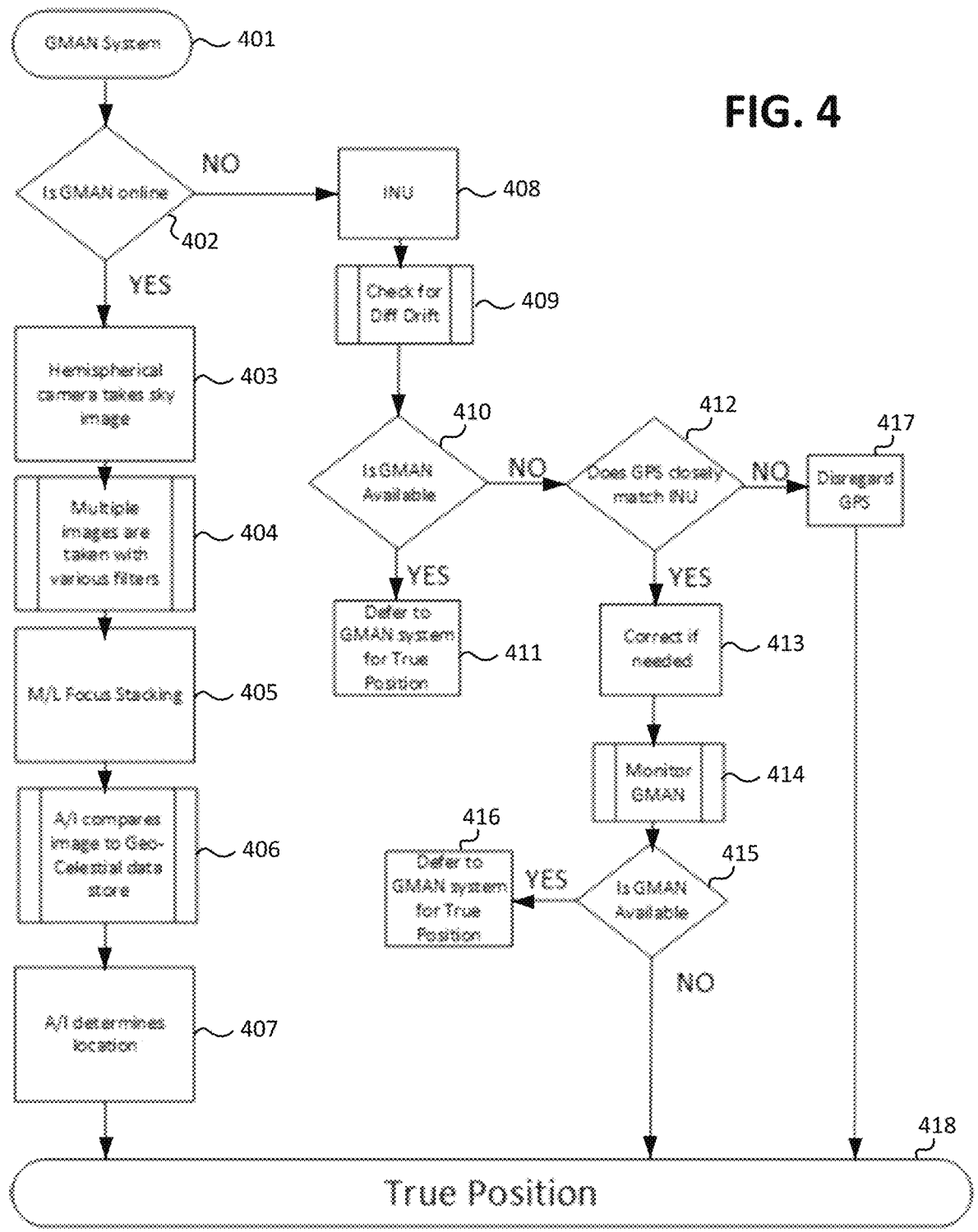
FIG. 4 is an example flowchart of steps that may be performed as described herein.

FIG. 4 shows an example flowchart of how the apparatus 100 may operate. In step 401, the apparatus 100 may be turned on. The power source may be internal to the apparatus 100 (such as using a battery) or may be external to the apparatus 100, such as provided by a vehicle to which the apparatus 100 is mounted or by a fixed ground power source.

At step 402, the controller 301 may determine whether the GMAN subsystem 302 is available (e.g., online). If so ("YES"), then at step 403 the controller 301 may cause the camera 101 to take an image through a first filter of the filter set 111. At step 404, the controller 301 may further cause the camera 101 to take one or more additional images through one or more additional different filters of the filter set 111. If the apparatus 100 is stationary, then the plurality of images taken in steps 403 and 404 may be of the same (or nearly identical) portions of the sky or of space. If the apparatus 100 is moving (e.g., along with a vehicle), then the plurality of images taken in steps 403 and 404 may be of different portions of the sky or of space, wherein the difference in those portions depends upon the speed of the movement during steps 403 and 404. For example, steps 403 and 404 may result in the four different images of the sky show in FIG. 2A.

At step 405, the controller 301 may cause the GMAN sub system 302 (e.g., the ML unit 104) to perform focus stacking of the plurality of images that were produced by steps 403 and 404. Step 405 may result in a final focus-stacked image such as represented in FIG. 2B, in which one or more of the celestial objects in the plurality of images are each represented only once in the final focus-stacked image. The ML unit 104 may also receive input from the APNT sub system 303 and/or from the GPS sub system 304 to assist in determining the distance that the GMAN sub system 302 has travelled (if any) between each of the plurality of images taken, and to use this distance travelled as part of determining how to focus-stack the images into the single final image.

At step 406, the controller 301 may cause the GMAN sub system 302 (e.g., the AI processing unit 105) to compare the final focus-stacked image with one or more maps of celestial objects (e.g., one or more sky maps) stored in the geo-celestial data store 106. At step 407, and based at least on the comparison, the AI processing unit 105 may determine a location of the apparatus 100. Also at step 407, the determined location may be stored in, e.g., the storage 306. Further, at step 418, the controller 301 may determine that the location determined at step 407 is the true position of the apparatus 100. This true position may be output by the apparatus 100, such as by being displayed to the user and/or by being output via the API 305 for consumption by one or more true position consumers (e.g., one or more persons and/or devices communicatively connected to the apparatus 100).

Returning to step 402, if alternatively the controller 301 determines that the GMAN sub system 302 is not available (e.g., not online, or the camera 101 view is blocked or otherwise inadequate) ("NO"), then at step 408, the controller 301 may select the next-highest level of trust sub system to determine location. In this example, the APNT sub system 303 would have the next-highest level of trust, and so the controller 301 may obtain data from the APNT sub system 303 (e.g., the INU 108) indicative of movement and/or position. Element 409, described more fully below, refers to a process that may include at least steps 410, 411, 412, 413, and 417, in which the controller 301 may again determine whether the GMAN sub system 302 can be used, and if not, the controller 301 may determine whether the APNT sub system 303 or the GPS sub system 304 should instead be used based on the amount of differential drift that has accumulated in the APNT sub system 303. Moreover, if the differential drift is not excessive relative to the GPS sub system 304, the APNT sub system 303 may be adjusted to match the location indicated by the GPS sub system 304. Otherwise, if the differential drift is excessive relative to the GPS sub system 304, then the controller 301 may determine that the GPS satellite system has been compromised (e.g., spoofed or jammed) and may disregard the GPS sub system 304 for purposes of determining true position.

Specifically, to implement process 409, at step 410 the controller 301 may again determine whether the GMAN sub system 302 is available. While steps 402 and 410 (and step 415, discussed below) check for GMAN sub system 302 availability, this may be performed at any of one or more times during the process of FIG. 4, and indeed may be performed periodically or continuously throughout the entire process or throughout one or more portions of the process. If the controller 301 determines that the GMAN sub system 302 is available ("YES"), then the process may proceed to step 411, which may lead to the controller 301 causing steps 403-407 to be performed by deferring to the GMAN sub system 302 (having the highest level of trust) to determine the location of the apparatus 100.

If, on the other hand, the controller 301 determines at step 410 that the GMAN sub system 302 remains unavailable ("NO"), then at step 412 the controller may obtain location information from the GPS sub system 304 and determine whether that location information indicates a location that matches closely with the information received from the APNT sub system 303 in step 408. In other words, the controller 301 may determine whether there is a significant difference (e.g., differential drift) between the position indicated using the APNT sub system 303 and the GPS sub system 304. In step 412, the controller 301 may, for example, determine a first location corresponding to information received from the APNT sub system 303, determine a second location corresponding to information received from the GPS sub system 304, and compare the first location with the second location to determine whether they are within a threshold distance from one another. The threshold distance may be of any distance value desired, such as a threshold distance having a value in the range of five feet to ten meters, or a threshold distance having a value in the range of ten feet to fifty meters, or a threshold distance having any value that is less than one hundred meters.

If the controller 301 determines at step 412 that the GPS sub system 304 derived location does not closely match the APNT sub system 303 derived location (e.g., if they are not within the threshold distance of each other) ("NO"), then the controller 301 may determine that the GPS sub system 304 is not reliable (for example, the GPS satellite system has been compromised), and the process may move to step 417. Otherwise ("YES"), the process may move to step 413.

At step 413, the controller 301 may determine a corrected location based on one or both of the locations (e.g., the first location and/or the second location) that were compared in step 412. For example, the controller 301 may correct one of the two locations (e.g., the location determined using the APNT sub system 303) to match the other location (e.g., the location determined using the GPS sub system 304) as the corrected location, or may combine the two locations (e.g., taking their average) to determine the corrected location. Any of the locations or other information determined in any of the steps of FIG. 4 may be stored in, e.g., the storage 306.

At steps 414 and 415, the controller 301 may again monitor the GMAN sub system 302 and again determine whether the GMAN sub system 302 has become available. If so ("YES"), then the process may move to step 416, in which the processor 301 may defer to the GMAN sub system 302 for location by causing steps 403-407 to be performed. If not ("NO"), then the process may move to step 418, in which the controller 301 may determine that the corrected location determined at step 413 (based on information from the APNT sub system 303 and/or from the GPS sub system 304) is the true position of the apparatus 100. This true position may be output by the apparatus 100, such as by being displayed to the user and/or by being output via the API 305 for consumption by one or more true position consumers (e.g., one or more persons and/or devices communicatively connected to the apparatus 100).

Returning to step 412, if the controller 301 determines at step 412 that the GPS sub system 304 derived location does not closely match the APNT sub system 303 derived location (e.g., if they are not within the threshold distance of each other) ("NO"), then the process may move to step 417. At step 417, because the controller 301 may have determined that the GPS sub system 304 is currently unreliable, any information from the GPS sub system 304 may be disregarded for purposes of determining the location of the apparatus 100, and at step 418 the controller 301 may determine that the location determined at step 408 (from the APNT sub system 303) is the true position of the apparatus 100. This true position may be output by the apparatus 100, such as by being displayed to the user and/or by being output via the API 305 for consumption by one or more true position consumers (e.g., one or more persons and/or devices communicatively connected to the apparatus 100).

Thus, in the process of FIG. 4, the apparatus 100 may preferentially use the sub system having the highest level of trust (in this example, the GMAN sub system 302) to determine the true position. If the highest level of trust sub system is not available, then the apparatus 100 may defer to the sub system having the next (second) highest level of trust (in this example, the APNT sub system 303) to determine the true position, and may also rely on the sub system having the third highest level of trust (in this example, the GPS sub system 304), if available and appropriate, to verify the true position and/or to correct the true position if needed to account for differential drift. Moreover, if both the highest and the second-highest trusted sub system are determined to not be available, the apparatus 100 may rely only on the GPS sub system 304 to determine true position.

Figure 5:
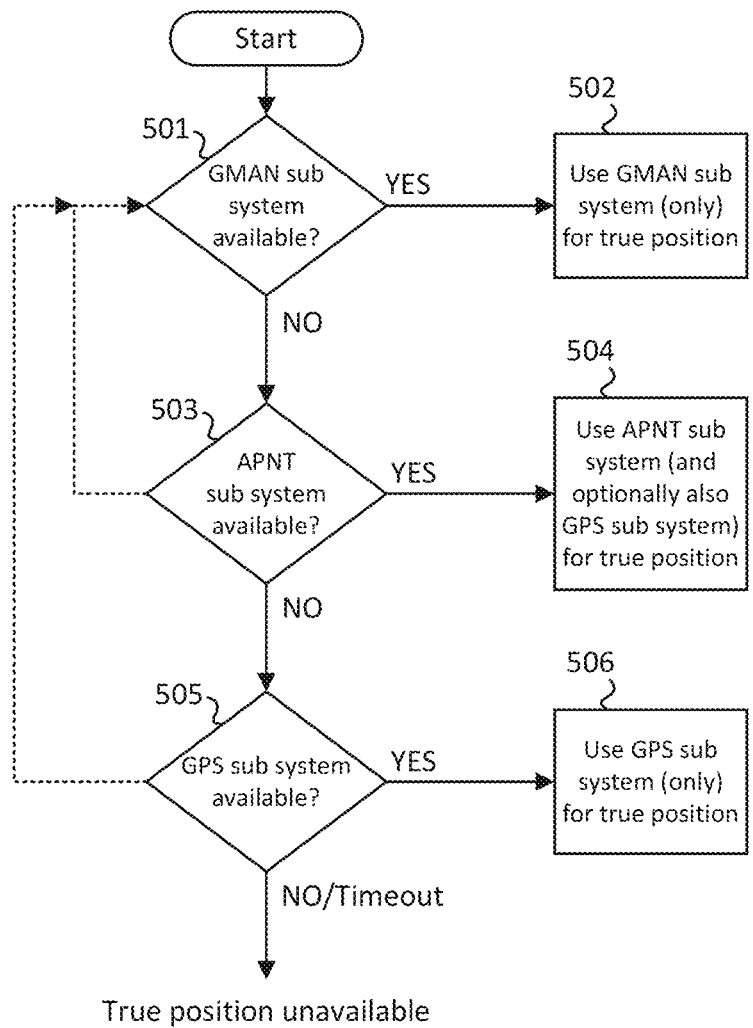
FIG. 5 is another example flowchart of steps that may be performed as described herein.

FIG. 5 shows another example flowchart of how the apparatus 100 may operate. As in the FIG. 4 example, it will also be assumed for FIG. 5 that the GMAN sub system 302 has the highest level of trust, the APNT sub system 303 has the second-highest level of trust, and the GPS sub system 304 has the third-highest level of trust. Any of the steps of the process of FIG. 5 may modify one or more steps of the process of FIG. 4 or may be operated in parallel with steps of the process of FIG. 4.

Once the apparatus 100 has been powered up (as discussed previously with respect to step 401), at step 501 the controller 301 may determine whether the sub system having the highest level of trust (in this example, the GMAN sub system 302) is available (e.g., whether it is online and/or whether the camera 101 has an adequate view). If so ("YES"), then at step 502 the controller 301 may use only the sub system having the highest level of trust (the GMAN sub system 302) to determine the true position, and may store and then output this true position as described above with respect to step 418. If not ("NO"), then the process may move to step 503.

At step 503, the controller 301 may determine whether the second-highest level of trust sub system (in this example, the APNT sub system 303) is available. If so ("YES"), then at step 504 the controller 301 may use the second-highest level of trust sub system (the APNT sub system 303) to determine the true position, with or without use of the third-highest level of trust subsystem (the GPS sub system 304) as desired and appropriate, and may store and then output this true position as described above with respect to step 418. If not ("NO"), then the process may move to step 505.

At step 505, the controller 301 may determine whether the third-highest level of trust sub system (in this example, the GPS sub system 304) is available. If so ("YES"), then at step 506 the controller 301 may use only the third-highest level of trust sub system (the GPS sub system 304) to determine the true position, and may store and then output this true position as described above with respect to step 418. If not ("NO"), then after a predetermined timeout period in which the GPS sub system 304 or any other sub system (303 and/or 304) continues to be unavailable, the apparatus 100 may indicate to the user (e.g., via a displayed message) that the true position is not currently available.

The flowchart of FIG. 5 also indicates broken arrows leading from steps 503 and 505 back to step 501. This is to signify that the controller 301 may continue to monitor the GMAN sub system 302 for availability. Thus, step 501 may be repeatedly performed to monitor the availability of the GMAN sub system 302. If the GMAN sub system 302 was unavailable and then becomes available at any point during the process of FIG. 5, the process may abort proceeding to steps 504 or step 506 and may instead return to step 502 to rely on the GMAN sub system 302 to determine the true position.

While in the various examples above, the GMAN sub system 302 was considered to have the highest level of trust, the APNT sub system 303 was considered to have the second-highest level of trust, and the GPS sub system 304 was considered to have the third-highest level of trust, any of these sub systems 302-304 may have different positions on the level-of-trust hierarchy as desired. Moreover, other types of sub systems may be used to determine location and/or true position, and fewer than three or greater than three sub systems may be used. For example, there may be only two sub systems (e.g., the GMAN sub system 302 having the highest level of trust and either the APNT sub system 303 or the GPS sub system 304 having the second-highest level of trust), where there is no third-highest level of trust sub system. In such a case, the "NO" branch of step 503 may lead directly to the waiting for the timeout that may lead to no true position being available. In other examples, there may be four sub systems having, respectively, first through fourth levels of trust, or five sub systems having, respectively, first through fifth levels of trust, etc. In any of the described examples herein, the apparatus 100 may generate data identifying (1) the true position, such as the true position determined at steps 418 or 502-506); (2) which level of trust applies to the true position; (3) which one or more sub systems were used to determine the true position; and/or (4) a timing (e.g., a timestamp) that applies to the true position. The apparatus 100 may store this data in one or more computer-readable media (such as storage 306), and may provide some or all of this data to a true-position consumer such as a human operator of the apparatus 100 or another device communicatively coupled to the apparatus 100. Examples of such other devices communicatively coupled to the apparatus 100 may include a computer of the vehicle to which the apparatus 100 may be attached, some other computer, a display device, etc. The apparatus 100 may also include a display device (not explicitly shown) that may be at least partially disposed in the housing of the apparatus 100. Some or all of the generated data may be displayed, or may be used to display a user interface via the display device. Some or all of the generated data may be additionally or alternatively sent to another device communicatively connected to the apparatus 100, such as via one or more transmission ports and/or via the API 305.

The functions and steps described herein may be embodied in computer-usable data or computer-executable instructions, such as in one or more program modules, executed by one or more computers or other devices to perform one or more functions described herein. For example, the one or more computers or other devices that may execute the instructions may include the processor 301 and/or any other elements described with respect to FIG. 1 or 3. Generally, program modules include routines, programs, objects, components, data structures, etc. that perform particular tasks or implement particular abstract data types when executed by one or more processors in a computer or other data-processing device. The computer-executable instructions may be stored on one or more computer-readable media, such as the storage 306, such as a magnetic disk, optical disk, removable storage media, solid-state memory, random-access memory (RAM), ready-only memory (ROM), flash memory, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Moreover, any of the information described herein (e.g., location information, indications of levels of trust, map data, etc.) may be stored as computer-usable data in one or more computer-readable media such as the storage 306. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

The invention claimed is:

1. An apparatus comprising:
an optical unit configured to receive at least one image of a plurality of celestial objects;
a global positioning system (GPS) receiver;
one or more processors; and
one or more computer-readable media storing instructions that, when executed by the one or more processors, cause the apparatus to:
prioritize, for determining a location of the apparatus, using the optical unit over using the GPS receiver;
based on a determination that the optical unit is able to indicate the location of the apparatus, determine, using the optical unit and based on positions in the at least one image of at least some of the plurality of celestial objects, the location of the apparatus; and
based on a determination that the optical unit is not able to indicate the location of the apparatus, determine, using the GPS receiver, the location of the apparatus.

2. The apparatus of claim 1, wherein the optical unit comprises a hemispherical camera.

3. The apparatus of claim 1, wherein the at least one image comprises a plurality of images, and wherein the instructions, when executed by the one or more processors, cause the apparatus to determine, using the optical unit, the location of the apparatus by:
using the optical unit to take the plurality of images each using a different filter of a plurality of filters;
focus-stacking the plurality of images to produce a focus-stacked image; and comparing the focus-stacked image with a predetermined map of celestial objects to determine the location.

4. The apparatus of claim 3, wherein the apparatus further comprises an inertial navigation unit (INU), and wherein the instructions, when executed by the one or more processors, cause the apparatus to focus-stack the plurality of images using information from the INU.

5. The apparatus of claim 3, wherein the plurality of filters comprises a #8 light yellow filter, a #21 orange filter, a #80A blue filter, and a Baader Neodymium filter.

6. The apparatus of claim 1, wherein the apparatus comprises a housing, and wherein the optical unit and the GPS receiver are each at least partially disposed within the housing.

7. The apparatus of claim 1, wherein the apparatus is coupled to a vehicle.

8. The apparatus of claim 1, wherein the instructions, when executed by the one or more processors, cause the apparatus to cause display of an indication that is based on whether the optical unit was used to determine the location.

9. The apparatus of claim 1, wherein the instructions, when executed by the one or more processors, cause the apparatus to determine the location of the apparatus using the optical unit:
based on determining that the optical unit is able to indicate the location of the apparatus; and
regardless of whether the GPS receiver is able to indicate the location of the apparatus.

10. The apparatus of claim 1, wherein the instructions, when executed by the one or more processors, cause the apparatus to prioritize using the optical unit over using the GPS receiver, by determining the location of the apparatus using:
the optical unit, based on a predetermined hierarchy of the optical unit relative to the GPS receiver, and based on determining that the optical unit is able to indicate the location of the apparatus, and
the GPS receiver, based on the predetermined hierarchy, and based on determining that the optical unit is not able to indicate the location of the apparatus.

11. A method comprising:
prioritizing, for determining a location of an apparatus that comprises an optical unit and a global positioning system (GPS) receiver, using the optical unit over using the GPS receiver;
determining whether an optical unit is able to indicate the location of the apparatus, wherein the optical unit is configured to receive at least one image of a plurality of celestial objects;
based on determining, at a first time, that the optical unit is able to indicate the location of the apparatus:
determining a first location of the apparatus using the optical unit and based on positions in the at least one image of at least some of the plurality of celestial objects; and
based on determining, at a second time, that the optical unit is not able to indicate the location of the apparatus:
determining a second location of the apparatus using the GPS receiver.

12. The method of claim 11, wherein the optical unit comprises a hemispherical camera.

13. The method of claim 11, wherein the at least one image comprises a plurality of images, and wherein the determining the first location of the apparatus using the optical unit comprises:
using the optical unit to take the plurality of images each using a different filter of a plurality of filters;
focus-stacking the plurality of images to produce a focus-stacked image; and
comparing the focus-stacked image with a predetermined map of celestial objects to determine the location.

14. The method of claim 13, wherein the apparatus further comprises an inertial navigation unit (INU), and wherein the focus-stacking comprises focus-stacking the plurality of images using information from the INU.

15. The method of claim 11, further comprising displaying an indication that is based on whether the optical unit was used to determine the location.

16. A non-transitory computer-readable medium storing instructions that, when executed, configure an apparatus to:
prioritize, for determining a location of the apparatus, using an optical unit over using a global positioning system (GPS) receiver;
determine whether the optical unit is able to indicate the location of the apparatus, wherein the optical unit is configured to receive at least one image of a plurality of celestial objects;
based on a determination that the optical unit is able to indicate the location of the apparatus, determine, using the optical unit and based on positions in the at least one image of at least some of the plurality of celestial objects, the location of the apparatus; and
based on a determination that the optical unit is not able to indicate the location of the apparatus, determine, using the GPS receiver, the location of the apparatus.

17. The non-transitory computer-readable medium of claim 16, wherein the at least one image comprises a plurality of images, and wherein the instructions, when executed, configure the apparatus to determine, using the optical unit, the location of the apparatus by:
using the optical unit to take the plurality of images each using a different filter of a plurality of filters;
focus-stacking the plurality of images to produce a focus-stacked image; and
comparing the focus-stacked image with a predetermined map of celestial objects to determine the location.

18. The non-transitory computer-readable medium of claim 17, wherein the apparatus further comprises an inertial navigation unit (INU), and wherein the instructions, when executed, configure the apparatus to focus-stack the plurality of images using information from the INU.

19. An apparatus comprising:
an optical unit;
a global positioning system (GPS) receiver;
one or more processors; and
one or more computer-readable media storing instructions that, when executed by the one or more processors, cause the apparatus to:
based on a determination that the optical unit is able to indicate a location of the apparatus:
use the optical unit to take, using a different filter of a plurality of filters, a plurality of images;
focus-stack the plurality of images to produce a focus-stacked image; and
compare the focus-stacked image with a predetermined map of celestial objects to determine the location of the apparatus; and
based on a determination that the optical unit is not able to indicate the location of the apparatus, determine, using the GPS receiver, the location of the apparatus.

20. The apparatus of claim 19, wherein the apparatus further comprises an inertial navigation unit (INU), and wherein the instructions, when executed by the one or more processors, cause the apparatus to focus-stack the plurality of images using information from the INU.

21. The apparatus of claim 19, wherein the plurality of filters comprises a #8 light yellow filter, a #21 orange filter, a #80A blue filter, and a Baader Neodymium filter.

22. The apparatus of claim 19, wherein the instructions, when executed by the one or more processors, cause the apparatus to use the optical unit to take the plurality of images, based on the determination that the optical unit is able to indicate the location of the apparatus and further based on a predetermined hierarchy of the optical unit relative to the GPS receiver.

23. The apparatus of claim 19, wherein the instructions, when executed by the one or more processors, cause the apparatus to cause display of an indication that is based on whether the optical unit was used to determine the location of the apparatus.

* * * * *